May 26, 1931.  H. KEIZER  1,807,039
SPLASH GUARD
Filed Nov. 8, 1929
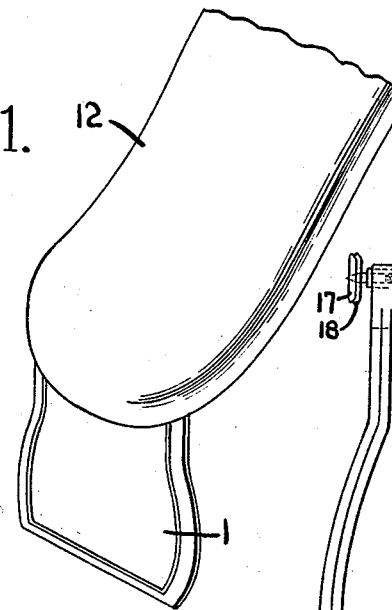
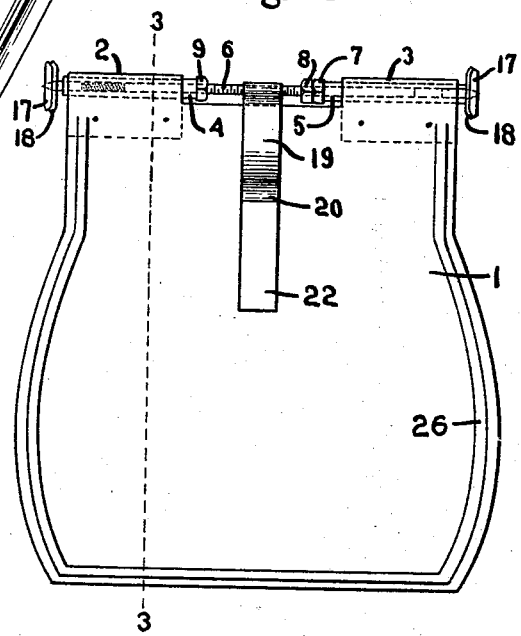
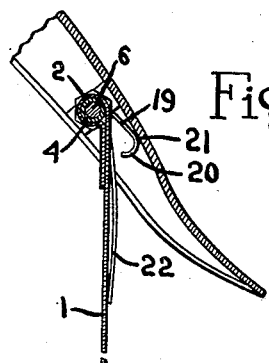
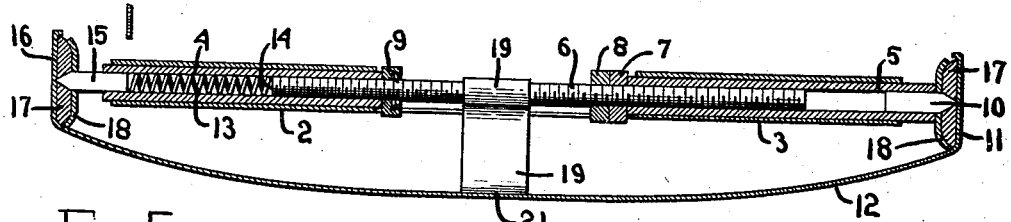
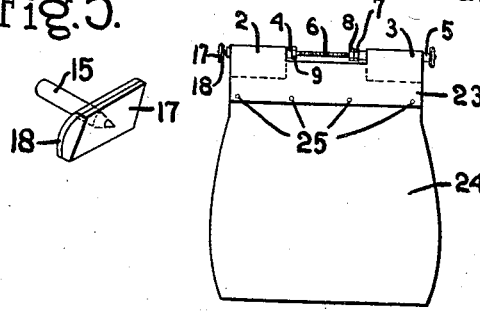
Inventor.
Harold Keizer
by Heard Smith & Tennant
Attys.

Patented May 26, 1931

1,807,039

UNITED STATES PATENT OFFICE

HAROLD KEIZER, OF CONCORD, MASSACHUSETTS

SPLASH GUARD

Application filed November 8, 1929. Serial No. 405,659.

This invention relates to splash guards for vehicles which have the usual type of mudguards which are generally U-shaped in cross section, and provided with downwardly extending flanges at the edges thereof.

In the design of vehicles such as automobiles a certain definite amount of road clearance must be maintained beneath the ends of the mudguards to permit them to pass over the top of a curbing or other obstruction when parking or turning the vehicle. In consequence of this unavoidable restriction in design the normal function of the mudguard is greatly impaired.

A large part of the material used in road surfacing is of a character that adheres to the vehicle tires, and is thrown upwardly with great force when the vehicle is in motion. Much of this material is permitted to pass beneath the lower edge of the mudguard, and is further aided in its flight by air currents caused by the motion of the vehicle, and may be thrown against the vehicle body or the outer surface of the mudguards themselves, where it adheres to cause much damage.

It is the general object of this invention to provide a splash guard designed to intercept this material, and all other material splashed up from the road, and thereby prevent its deposit upon the car body.

A further object of the invention is to provide a splash guard which is readily attached to a mudguard in a manner to prevent its slipping out of position or becoming entirely detached from the mudguard.

A further object of the invention is to provide a method of attachment to the mudguard which combines the resistance offered by a sharp metal point in engagement with the mudguard, and a yielding friction pad surrounding the metal point, and engaging a relatively large area of the flange of the mudguard.

A further object of the invention is to provide a splash guard which normally assumes a substantially vertical position, and which has a yielding stop to maintain the guard in this position despite the forward motion of the vehicle.

A further object of the invention is to provide a splash guard having a rigid supporting member extensible under the action of a spring to engage the inner faces of the downwardly extending flanges of the mudguards.

These and other objects and features will more fully appear from the accompanying drawings in connection with the specification, and will be particularly pointed out in the claims.

In the drawings:

Fig. 1 is a perspective view of a preferred embodiment of the invention as applied to the mudguard of an automobile.

Fig. 2 is a rear elevation of the splash guard detached from the mudguard.

Fig. 3 is a cross sectional view on line 3—3 Fig. 2.

Fig. 4 is a horizontal cross sectional view through the axis of the supporting member showing the method of attaching the splash guard to the mudguard.

Fig. 5 is a perspective view of a modified form of the end members which engage the flanges of the mudguard.

Fig. 6 is a view showing a modified form of the device.

In order to more clearly present the principles of invention, a particular embodiment is herein shown. It is to be understood, however, that the device may be constructed in any manner consistent with the spirit and scope of the claims. The device as herein shown consists of a splash plate 1 having two cylindrical axially aligned bearing portions 2 and 3 at its upper edge which are preferably formed by shaping portions of the splash plate. A space is left between the two bearing portions near the center of the plate 1 to provide for asembling parts to be hereinafter described. An especially constructed supporting member is received within the bearing members 2 and 3, and comprises a sleeve 4 fitted into the bearing portion 2, and a sleeve 5 fitted within the bearing portion 3. These sleeves 4 and 5 are slightly longer than the bearing portions 2 and 3, and consequently project slightly beyond the ends thereof. A threaded rod 6 extends at one end into the sleeve 4, and at its other end into the sleeve 5, and has thereon a nut 7 which engages the end of the sleeve 5 and is adjustable along the rod to determine the position of the rod 6 within the sleeves. A lock nut 8 is also provided to prevent movement of the nut 7 after a correct adjustment has been obtained. Another nut 9 bears against the inner end of the sleeve 4 which, when properly adjusted, prevents relative movement between the rod and the bushings.

A hard metal point 10 is inserted in the end of the sleeve 5, and may be fixed thereto or may rotate relatively thereto. The point 10 extends beyond the sleeve 5 to engage the flange 11 of the mudguard 12. A compression spring 13 within the sleeve 4 bears at one end against the end 14 of the rod 6, and at its other end against a hard metal point 15 which is longitudinally movable within the sleeve 4, and is forced under the action of the spring into engagement with the flange 16 of the mudguard 12.

In order to provide an additional locking engagement with the mudguard flanges, the points 10 and 15 are surrounded by resilient friction pads 17 of rubber or other suitable material. The pads 17 are retained within metal socket members 18 welded or otherwise secured to the points 10 and 15. If desired, the rubber pads 17 may be cemented to the socket members in order to retain them temporarily in position while installing the device. It is obvious, however, that the cement is not required when the device is in position since the pressure of the spring 13 will clamp them firmly in place. The socket members may be made in a variety of ways in order to adapt the device to the varied requirements of different makes of vehicles. Fig. 5 illustrates a socket member shaped to present a concave cylindrical recess extending lengthwise of the socket member to receive the friction pad 17. The socket members shown in Fig. 4 in contrast to that illustrated in Fig. 5 are bent up at their ends to enclose the rubber pads. In applying the device to various makes of vehicles the pad is chosen which is best adapted to fit the particular flange structure in question.

To apply the device the nut 7 is moved sufficiently to relieve the tension of the spring 13, and permit the point 15 to be retracted into the sleeve 4 sufficiently to permit the complete supporting member assembly with the splash guard thereon to be inserted between the flanges 11 and 16. The nut 7 is then forced against the inner end of the sleeve 5 to move the rod 6 toward the left in Fig. 4 until the tension in the spring 13 is sufficient to firmly hold the supporting member in place. The nut 9 is then screwed up against the sleeve 14 to prevent any possible movement of the rod 6. After these adjustments are complete the lock nut 8 is forced against the nut 7 to retain the parts in their adjusted position. It is evident that the spring 13 acts directly upon the point 15 to force it against the flange 16, and reacts through the rod 6 and the sleeve 5 to force the point 10 against the flange 11.

The friction pads 17 are of such thickness that they are firmly compressed against the flanges 11 and 16 as the points 10 and 15 engage the metal of the mudguard, the two retaining elements acting together to establish a firm union of the splash guard with the mudguard. The weight of the splash plate normally causes it to hang vertically, but as the vehicle is set in motion the force of the air against the plate tends to raise the guard out of its effective position. In order to prevent such possibility a resilient stop 19 is attached to the rod 6 at any convenient point preferably in the center thereof, and has a rearwardly extending arm 20 which engages the inner face of the mudguard at 21 when the splash plate 1 is in a substantially vertical position. The other end 22 of the yielding stop member 19 is shaped to engage the rear face of the splash plate 1. The pressure of the air against the splash plate when the car is in motion is never sufficient to flex the yielding stop 19. However, if a solid obstruction comes in contact with the plate, the stop 19 will yield and thus prevent damage to the mudguard or to the plate.

The splash plate 1 as shown is made of stiff sheet material such as sheet metal, and desirably has formed along its sides and lower edge a corrugated reenforcement in the form of a rib 26. In Fig. 7 is illustrated a modified form of the device in which a short plate 23 is employed having the same construction at its upper edge as the plate 1, the bearing members 2 and 3 of which receive a supporting member similar to that already described. A flexible panel 24 of a material differing in character from that of the plate 23 may desirably be of flexible or semi-flexible sheet material and is secured to the lower edge of the plate 23 in any convenient manner as by means of the rivets 25.

Having thus described the invention, what is claimed as new, and desired to be secured by Letters Patent, is:

1. A splash guard, for vehicles having mudguards provided with downwardly extending flanges, comprising a splash plate having at its upper and cylindrical bearings, sleeves slidably mounted in said bearings, a sectional supporting member comprising a screw threaded rod mounted in said sleeves having nuts engaging the inner ends of said sleeves, and provided at their outer ends with points, socket members secured to said points and adapted to support said splash guard in a substantially vertical position, and a resilient stop to prevent the guard from assuming an ineffective position due to the pressure of air upon the plate when the vehicle is in motion.

2. A device of the class described comprising a splash guard for vehicles, means supporting the same from the mud guard of a vehicle, and a resilient stop having means engaging the mud guard and splash guard operable to prevent said splash guard from assuming an ineffective position due to the pressure of air upon the splash guard when the vehicle is in motion.

3. A device of the class described comprising a splash guard for vehicles having mud guards provided with downwardly extending flanges, means for pivotally supporting the same from the flanges of said mud guards, a spring mounted upon said supporting means having portions engaging respectively the mud guard and the splash guard operable to prevent the guard from assuming an ineffective position due to the pressure of the air upon the splash guard when the vehicle is in motion.

4. A spring for a splash guard for vehicles comprising a resilient member having means to engage the support for the splash guard and extensions respectively operable to engage the mud guards of the vehicle and the splash guard operable to prevent the splash guard from assuming an ineffective position due to the pressure of air upon the splash guard when the vehicle is in motion.

In testimony whereof, I have signed my name to this specification.

HAROLD KEIZER.